United States Patent
Bhattacharya et al.

(10) Patent No.: US 6,728,716 B1
(45) Date of Patent: Apr. 27, 2004

(54) CLIENT-SERVER FILTER COMPUTING SYSTEM SUPPORTING RELATIONAL DATABASE RECORDS AND LINKED EXTERNAL FILES OPERABLE FOR DISTRIBUTED FILE SYSTEM

(75) Inventors: Suparna Bhattacharya, Bangalore (IN); Karen W Brannon, Palo Alto, CA (US); Inderpal Singh Narang, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/571,778

(22) Filed: May 16, 2000

(51) Int. Cl.$^7$ .............................................. G06F 17/30
(52) U.S. Cl. ................................ 707/10; 707/1; 707/9; 707/100; 707/104.1; 707/200; 707/205; 713/202; 709/203; 709/219; 709/223
(58) Field of Search .................... 707/1–10, 100–104.1, 707/200–205; 709/203–235, 200; 703/200–202; 713/200–202

(56) References Cited

U.S. PATENT DOCUMENTS

| | | | | |
|---|---|---|---|---|
| 5,414,841 A | * | 5/1995 | Bingham et al. | 707/100 |
| 5,634,122 A | * | 5/1997 | Loucks et al. | 707/8 |
| 5,706,349 A | * | 1/1998 | Aditham et al. | 713/159 |
| 5,740,370 A | * | 4/1998 | Battersby et al. | 709/219 |
| 5,805,809 A | | 9/1998 | Singh et al. | |
| 5,832,512 A | * | 11/1998 | Mastors et al. | 707/202 |
| 5,881,229 A | | 3/1999 | Singh et al. | |
| 5,884,325 A | * | 3/1999 | Bauer et al. | 707/201 |
| 5,950,203 A | * | 9/1999 | Stakuis et al. | 707/10 |
| 6,029,160 A | * | 2/2000 | Cabrera et al. | 707/1 |
| 6,044,378 A | * | 3/2000 | Gladney | 707/103 R |
| 6,088,694 A | * | 7/2000 | Burns et al. | 707/8 |
| 6,088,796 A | * | 7/2000 | Cianfrocca et al. | 707/10 |
| 6,105,043 A | * | 8/2000 | Francisco et al. | 715/513 |

(List continued on next page.)

FOREIGN PATENT DOCUMENTS

| | | |
|---|---|---|
| WO | WO9524685 | 12/1994 |
| WO | WO9826528 | 12/1997 |
| WO | WO98/50843 | * 11/1998 |

OTHER PUBLICATIONS

H.M. Gladney. "Access Control for Large Collections". Apr. 1997. ACM Transactions on Information Systems vol. 15 No. 2. pp. 154–194.*

(List continued on next page.)

*Primary Examiner*—Srirama Channavajjala
(74) *Attorney, Agent, or Firm*—McGinn & Gibb, PLLC; T. Rao Coca, Esq.

(57) ABSTRACT

A client-server computing system is disclosed for supporting relational database records and linked external files. The system comprises one or more servers for storing external files, and a plurality of clients interlinked by a network. Each of the servers and certain of the clients have respective filter layers for controlling servicing of application requests relating to external files, for any application command of a protected class relating to an external file made to a client having a filter layer, the respective client filter layer determines the presence of a valid user token associated with the command, then passes the command to a server across the network. The server filter layer, if it recognizes the command, causes the command to be serviced by the server. However, for any application command of a protected class relating to an external file made to a client not having a filter layer, the command will be forwarded across the network to the server filter layer of a server holding the external file and the server filter layer will block the command from being serviced.

31 Claims, 4 Drawing Sheets

U.S. PATENT DOCUMENTS

| | | | | |
|---|---|---|---|---|
| 6,119,151 A | * | 9/2000 | Cantrell et al. | 709/216 |
| 6,122,631 A | * | 9/2000 | Berbec et al. | 707/9 |
| 6,182,111 B1 | * | 1/2001 | Inohara et al. | 707/10 |
| 6,233,576 B1 | * | 5/2001 | Lewis | 707/9 |
| 6,233,618 B1 | * | 5/2001 | Shannon | 707/10 |
| 6,263,330 B1 | * | 7/2001 | Bessette | 707/4 |
| 6,289,339 B1 | * | 9/2001 | Weber | 707/1 |
| 6,314,425 B1 | * | 11/2001 | Serbinis et al. | 707/10 |
| 6,321,219 B1 | * | 11/2001 | Gainer et al. | 707/3 |
| 6,324,182 B1 | * | 11/2001 | Burns et al. | 370/429 |
| 6,330,561 B1 | * | 12/2001 | Cohen et al. | 707/10 |
| 6,330,610 B1 | * | 12/2001 | Docter et al. | 709/202 |
| 6,393,435 B1 | * | 5/2002 | Gartner et al. | 707/200 |
| 6,477,544 B1 | * | 11/2002 | Bolosky et al. | 707/200 |

OTHER PUBLICATIONS

Silberschatz et al. Operating System Concepts: Fourth Edition. Addison Wesley Publishing Company. Jan. 1995. pp. 374–376, 512–517, and 525–568.*

Braam. "The Coda Distributed File System". Jan. 1998. Specialized Systems Consultants, Inc. ACM pp. 1–9.*

McDonald. "User–Level Distributed File Systems Projects". SIGCSE '96. Feb. 1996. ACM. pp. 333–337.*

Satyanarayanan et al. "Coda File System User and System Administrator's Manual". 1997. pp. 1–91.*

Research Disclosure–409114, May 1998, No. 409, 2 pgs.

* cited by examiner

CLIENT-SERVER FILTER COMPUTING SYSTEM SUPPORTING RELATIONAL DATABASE RECORDS AND LINKED EXTERNAL FILES OPERABLE FOR DISTRIBUTED FILE SYSTEM

BACKGROUND OF THE INVENTION

1. Field of the Invention

The present invention relates generally to distributed file systems and, in particular, to a filter file system for such distributed file systems.

1. Description of the Related Art

The merging of computers and communication has given rise to computer networks made up from a large number of separate but interconnected computers. A very common architecture is multiple 'client' machines being serviced by one or more 'server' machines. A database is usually associated with the server(s). File transfers and remote file accesses are two of the most common applications in any computer network, and particularly client-server systems. The interconnection of client and server machines may be via wire, laser optics, microwaves or communication satellites creating a local or wide area network (LAN or WAN). A reference herein to "a client" or "a server" is to be understood as meaning a client or server machine or process, respectively.

Database management systems (DBMS) have been developed to control the links between application programs and the data files used by the applications. To better manage the data files, they are often stored in a database accessed by a server connected to the network. Set against this, however, is a need to store external data files in close proximity to the application to reduce network traffic and maximize application performance.

During the past decade, relational database management systems (RDBMS) have become indispensable for their ability to manage traditional 'business data' with integrity, security, and reliability, and for their flexible data-access capabilities. However, the RDBMS is not an ideal solution when it comes to managing unstructured or semi-structured data (including documents, images, e-mail messages, presentations, engineering drawings, spreadsheets, video clips, and other business formats). Therefore, it is often a requirement for most of these types of data to remain outside the RDBMS in a separate file system.

These 'external' files are often related in some way to traditional data stored in the RDBMS. The files may further contain structured data that, if stored in a RDBMS along with a reference to the file, could be used for searching and analysis purposes. An overall "content-management" system is therefore required that integrates management of the file and its associated data, synchronizing updates, backup and recovery, and other functions across both the RDBMS and the file system. The "content-management" system is also required to address referential integrity issues, which include inconsistencies that could be caused by deletion, modification or renaming of external files by other file system applications without updating the references in the database.

An example of this requirement is the ability to link a file containing a photograph of a product (i.e., as it appears in a catalog) to inventory information on the product stored in a database. If the manufacturer stops selling the product, both the photograph and the inventory information should be deleted or archived. However, this level or coordination entails difficulties because the photograph is managed in the file system while the inventory information is managed by the RDBMS. Therefore, there is a need to manage the links between files and relational data, without having to move all of the data into the RDBMS. Primary examples of applications where this is a requirement are Internet and intranet applications.

SUMMARY OF THE INVENTION

It is an object of the present invention to substantially overcome, or at least ameliorate, one or more disadvantages of existing arrangements, including those to be described subsequently with reference to FIG. 1.

The invention provides a client-server computing system supporting relational database records and linked external files, wherein the system comprises:

(a) one or more servers storing external files, wherein each server has a filter layer for controlling the servicing of application requests relating to external files;

(b) one or more first type of clients, wherein each first type client has a filter layer adapted to cooperate with server filter layers for controlling the servicing of application requests relating to external files;

(c) one or more second type of clients, wherein each second type client servicing the application requests relating to external files; and (d) a network interconnecting the servers and the first and second type of clients; and wherein (i) for any application command of a protected class relating to an external file made to said first type of client, the respective client filter layer determines the validity of the command to a server across said network, whereby if the server filter layer recognizes said command, said server filter layer causes said command to be serviced by the server, and (ii) for any application command of a protected class relating to an external file made to the second type of client, the command will be forwarded across the network to the server filter layer of a server holding the external file and will be blocked from being serviced, and wherein the first and second type of clients comprise an access control system operable to transparently intercept file-system operations, whereby the operations comprise look-up, file-open, and file-access calls.

The invention further provides, in a client-server computing system comprising (a) one or more servers storing external files, each server having a filter layer for controlling servicing of application requests relating to external files, (b) one or more first type of clients, each first-type client having a filter layer adapted to cooperate with server filter layers for controlling servicing of application requests relating to external files, (c) one or more second type of clients, each second-type client servicing application requests relating to external files, and (d) a network interconnecting the servers and the first and second type of clients, wherein the first and second type of clients comprise an access control system operable to transparently intercept file-system operations, whereby the operations comprise look-up, file-open, and file-access calls, a method for supporting relational database records and linked external files comprising the steps of:

(i) for any application command of a protected class relating to an external file made to the first type of client:

(ia) determining by the respective client filter layer the validity of the command; and (ib) passing the command to a server across the network, wherein if the server filter layer, recognizes the command, causes it to be serviced by the server; and (ii) for any application command of a protected class relating to an external file made to the second type of client:

(iia) forwarding the command across the network to the server filter layer of a server holding the external file; and (iib) blocking the command by the server filter layer from being serviced.

A client filter layer can determine the validity of the command by determining the presence of a valid user token.

The invention further provides a client-server computing system supporting relational database records and linked external files, wherein the system comprises:

(a) a plurality of servers storing external files in a memory, wherein each server has a filter layer for controlling servicing of application requests relating to external files;

(b) a plurality of enabled clients, wherein each enabled client has a filter layer adapted to cooperate with server filter layers for controlling servicing of application requests to external files;

(c) a plurality of non-enabled clients, wherein each non-enabled client servicing application requests relating to external files;

(d) a database for storing relational records relating to the external files such that one or more relational records and one or more external files form a single data record; and (e) a network interconnecting the servers and the enabled and non-enabled clients; and wherein (i) for any application command of a protected class relating to a data record made to an enabled client, the application passing the command to the database, and the respective client filter layer determines the presence of a valid user token associated with the command, then passes the command relating to the corresponding external file to a server across the network, whereby if the server filter layer recognizes said command, said server filter layer causes said command to be serviced by the server, and (ii) for any application command of a protected class relating to an external file made to a non-enabled client, the command will be forwarded across the network to the server filter layer of a server holding the external file and will be blocked from being serviced, and wherein the enabled and non-enabled clients comprise an access control system operable to transparently intercept file-system operations, whereby the operations comprise look-up, file-open, and file-access calls.

Preferably, the client filter layer of both the first and second types of client will pass a non-protected application command relating to an external file to the filter layer of a server containing the external file, and will be serviced by the server.

The client filter layer of the first type of client preferably checks the validity of a token attached to the command strips the token before passing the command to the filter layer of the server containing the external file. Additionally, the client filter layer of the first type of client may perform impersonation for the protected command to the server containing the external file, the impersonation being in the form recognized by the server, the server then servicing the protected command. The computing system also includes a database, linked to the network, storing relational records related to the external files such that one or more relational records and one or more external files form a single data record, and wherein an application of a client of the first or second type also passes the command to the database for execution. Each server includes a storage system in which the external files are stored.

The client preferably includes a cache that can hold the external file and, if the external file is present, the command is executed, else the command is passed to the server filter layer. The command may be to open an external file, or alternatively to remove an external file.

The distribution of filter layer functionality for a set of commands between the clients and the servers preferably favors the servers if a command can be supported with: (i) correctness, or (ii) enforces integrity constraints or access restrictions.

BRIEF DESCRIPTION OF THE DRAWINGS

A number of preferred embodiments of the present invention will now be described with reference to the drawings, in which.

DETAILED DESCRIPTION INCLUDING BEST MODE

Data Link File System

Figure 1:
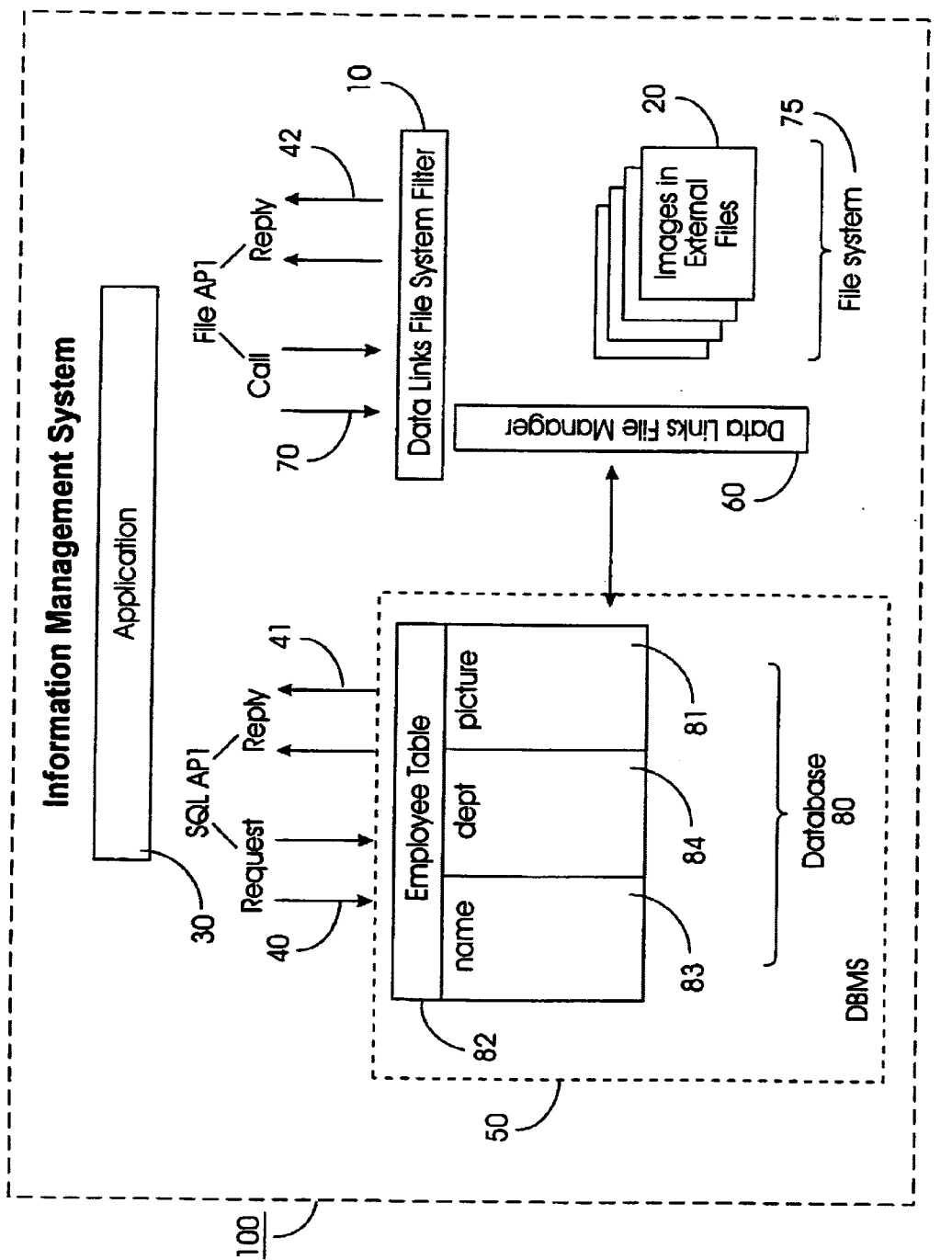
FIG. 1 is a schematic block diagram of a prior art system for managing links between a relational database and external data files.

Referring to FIG. 1, there is illustrated a block diagram of a known system 100 for managing links between a database 80 and external data files 20 referenced in the database 80. The example chosen for illustrative purposes is an employee records database, such as might be utilized by a corporation. The database 80 records reside within a DBMS 50. The external data files 20 are located in a native file system 75 and not in the database 80. An example of the file system 75 is JFS on AIX™, or NTFS on Windows NT™ products.

The database 80 stores an employee t able 82 including a name column 83, a department column 84, and a picture column 81. The name column 83 typically contains a string, the department column an integer, while the picture column would only contain a reference t o an image stored in on e of a number of external data files 20 . The external data file 20 may also contain other forms of data, including documents, presentations, engineering drawings, spreadsheets, or video clips.

It would be undesirable for any one of the external data files 20 to get deleted, modified, or renamed while that external data file 20 continues to be referenced by the database 80, and in particular the picture column 81. A Data Links File Manager is (DLFM) 60 is therefore provided for maintaining a table (not illustrated) of linked file references. The DLFM 60 may also be responsible for controlling access permission and ownership of the external data files 20. The table maintained by the DLFM 60 contains attributes and subsets of the data stored in the external data files 20, along with logical references to the location of the external data files 20.

In operation, an application program 30 searches the database 80 via a SQL Application Programming Interface (API) request 40 and reply 42 to identify database entries 80 of interest. In the example illustrated in FIG. 1, this would typically occur when an employee record is viewed and there is a requirement for the image of the employee to be displayed with his/her other information.

The DBMS 50, which is responsible for managing the links between the database 80 and the data files 20, provides to the application 30 references to the selected external data files 20. An example of the DBMS 50 is the DB2™ Universal Database product of International Business Machines Corporation. The application 30 can now access the external data file 20 directly using standard file-system API calls 70 and reply 72. A typical file-system API call 70 is "file-open".

There is also provided a Data Links File System DLFS 10, which is a thin, database control layer on the file system 75, that intercepts certain of the file-system API calls 70 issued by the application 30. The file-system API calls 70 that are intercepted include file-open, -rename , and -delete calls. If the external data file 20 is referenced in the database 80, then the DLFS 10 is responsible for enforcing referential-integrity constraints and access-control requirements defined for the data file 20. The referential integrity constraints ensure that the reference to data files 20 remains valid as long as it is "linked" to the database 80. This ensures that any access call 70 meets Database Management System (DBMS) 50 access control and integrity requirements.

The DLFS 10 also validates any authorization token (not illustrated) embedded in the file pathname for a 'file-open' operation. For example, when a user of application 30 submits a SQL API Request 40 to retrieve the employee picture (image) from the database 80, the DBMS 50 checks to see if the user has permission to access the employee table 82 containing the picture column 81. The permission may include select and view privileges on the employee table 82. The DBMS 50 only returns the file name of the external file 20 to the application 30 if the user has the required permission. An authorization token is embedded in the file name as part of the value returned for the picture column 81 by the DBMS 50. The application 30 then uses the file API call 70 to retrieve the image from the external file 20. When the DLFS 10 intercepts the file-open request, it validates the authorization token to determine whether or not to pass the file-open request through to the native file system 75. If the validation fails, the file-open request is rejected. Once access has been authorized by a valid token, the application 30 interacts directly with the file system 75 for delivery of the external file 20 without the need for the DLFS 10 to further control the file access. This allows the application 30 the same speed of access as a native file system.

It is to be understood that the validity of commands can be achieved in ways other than by user/authorization tokens. The client side filter layer can use any logic based on context available to it.

Datalink File System Implementation on a Distributed File System Environment The implementation of the Datalinks components in the system 100 illustrated in FIG. 1 only supports files residing on local file systems, as is the case with the native file system 75. The advent of the Distributed Computing Environment (DCE) has opened up new ways to quickly and transparently deliver data files to users, where the data files are from different sources and locations. To fully utilize the advantages that the DCE provides in transforming a group of networked computers into a single, coherent computing engine, the DLFS needs to be implemented on a Distributed Computing Environment Distributed File System (DCE-DFS).

A way of implementing a DLFS on remote file systems is to have a single file system filter layer for the file system at a fileserver. This single file system filter layer would operate in a similar manner as the DLFS 10 described with reference to FIG. 1. The file system may then be exported for network access from multiple remote clients via a remote file system protocol, the remote client connected through a network to the fileserver. This solution will work in cases where remote clients of the file system merely act as a redirector which simply pass requests on to the fileserver in more or less the same form in which they are invoked. Thus, requests essentially get handled at the fileserver via the same file system interfaces that would have been initiated locally on the fileserver, instead of from the remote client.

However, if a filter file system has to filter operations that are affected by client-side caching, then it is no longer sufficient to intercept those operations only at the fileserver. This particularly holds for more complex distributed file systems, like DCE-DFS, with stateful server implementations, more sophisticated caching algorithms, and stronger cache consistency mechanisms. In such systems, with more intelligence built into the remote clients, the control of the fileserver on the behaviour of the system is much less. In many situations, the remote client not only reuses previously cached results, as is, but the next time the same operation is invoked, it also tries to draw interpretations from the results and process some other operations based on those interpretations, without involving the fileserver in the decision. This is termed "authoritative caching", i.e., the remote client taking authoritative decisions on its own without contacting the fileserver.

Another possible way of implementing a DLFS on remote file systems is by having a client side filter layer installed on each of the remote clients. However, the sheer volume of remote clients in a DFS makes this solution problematic, especially in an environment like DCE-DFS, where a fileset that exists on a single fileserver is accessible from all DFS clients within such a system. In order to protect the fileset from any kind of unauthorized access or damage with respect to the filter file system functionality through client-only filter layers would require having the filter file system implementation on all DFS clients in the entire system. Additionally, there could be a serious integrity exposure if a DLFS control layer does not exist at the particular server where the source of the file system data resides.

The foregoing provides the rationale for following a split architecture approach, in which the filter file system implementation is a combination of server and client filter layers.

Figure 2:
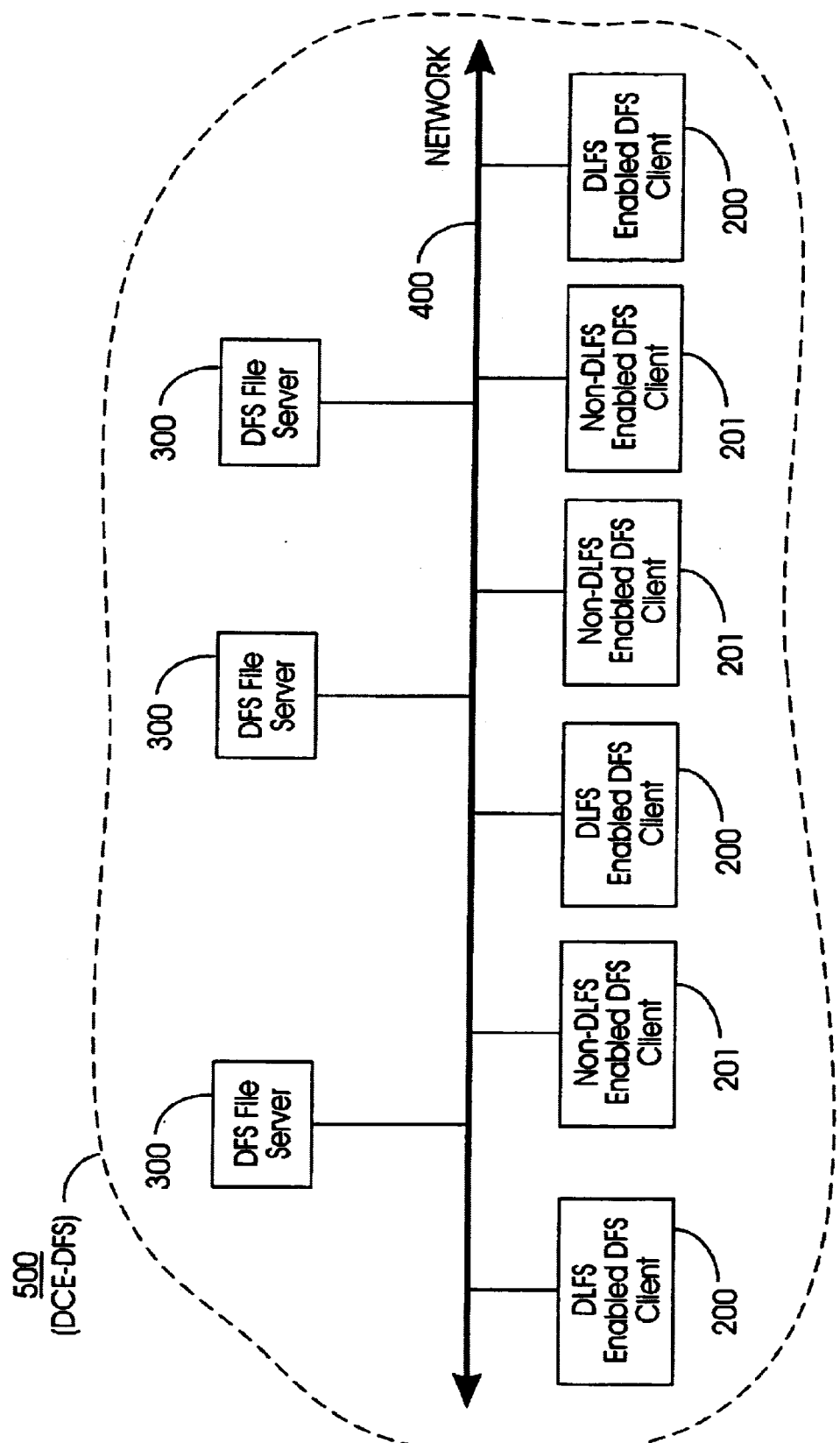
FIG. 2 is a schematic block diagram of a DCE-DFS configuration according to the invention.

FIG. 2 shows a block diagram of a DCE-DFS 500 configuration, which includes a few DFS file servers 300 and several DFS clients 200 and 201, all interconnected through a (Local or Wide Area) network 400. The DLFS functionality is split into components on DLFS-enabled DFS clients 200, and each of the DFS file servers 300. DLFS components are not, however, installed on all DFS clients (i.e. DFS clients 201).

Figure 3:
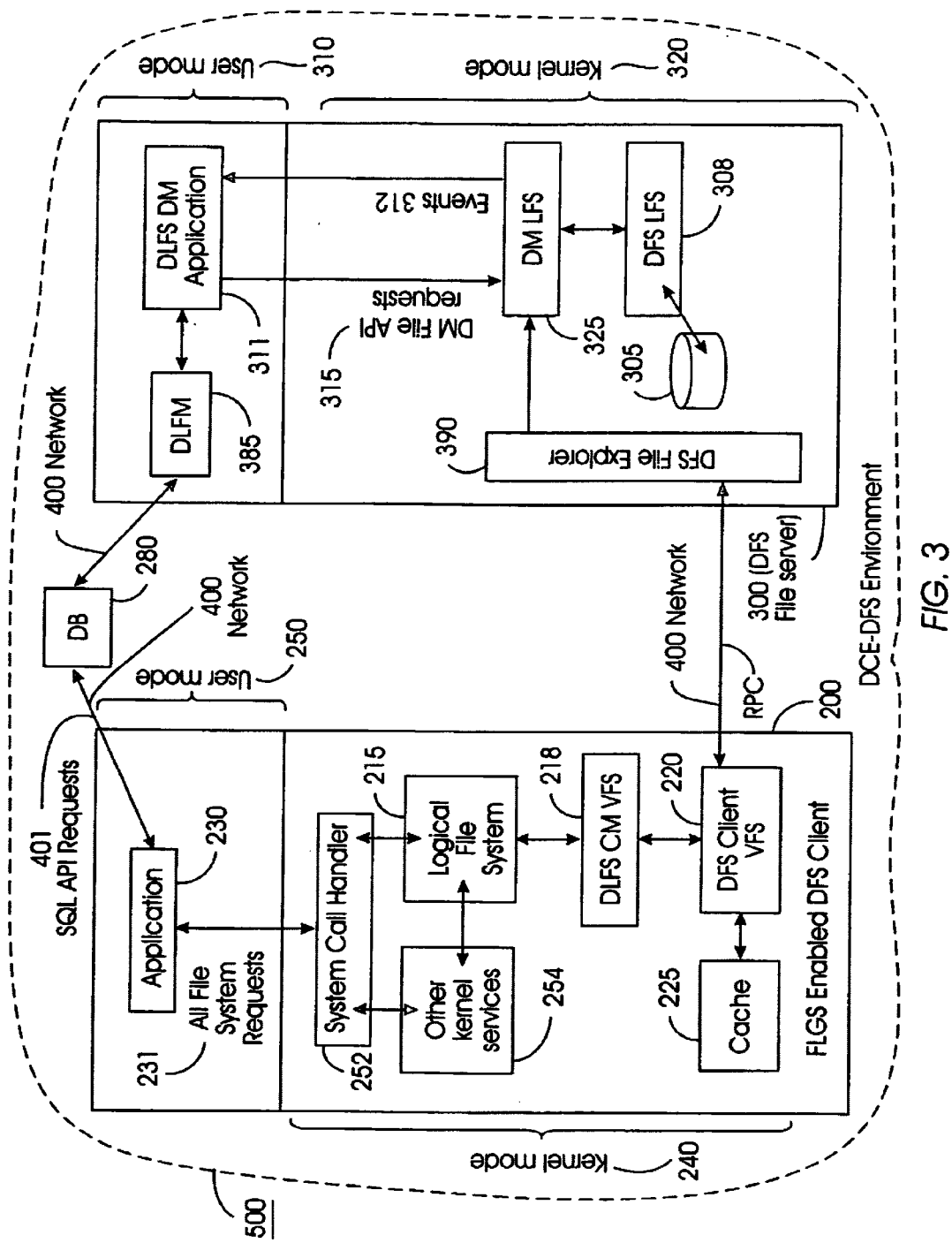
FIG. 3 is a schematic block diagram of a split architecture Data Link File System (DLFS) and its components within a server and a DLFS-enabled DFS client for managing links between a database and external data files.

FIG. 3 shows a more detailed block diagram of an implementation of DLFS on a DCE-DFS 500 configuration, in which, for convenience, only one DFS file server 300 and one DLFS-enabled client 200 is shown. A relational database DB 280 is shown that includes a number of fields that may contain data, or alternatively merely contain links to external data files which are not located in the relational database DB 280. For convenience, the client 200 is shown connected to the relational database DB 280 and the server 300 by the network 400. In one embodiment, the relational database DB 280 may form a part of the DCE-DFS 500 environment (i.e. it may be a DLFS-enabled client 200). Equally, there may be multiple databases 280 having links to data files residing on a storage system 305 of the same or different file servers 300.

A link between a field in the relational database DB 280 and its referenced data residing in the storage system 305 is created by making a SQL insert/update call from an application 230, running in a user mode 250 of the DLFS-enabled client 200, to that field in the relational database DB 280. The relational database DB 280 would interact with a Data Links File Manager 385 in user mode 310 of the DFS file server 300. The Data Links File Manager 385 maintains a table of links to referenced files in the storage system 305 of the DFS file server 300, which may include alterations of access permission and ownership. This table contains attributes and subsets of the data stored in the external data files, along with logical references to the location of the data files.

In addition to native operating system components, which include a system call handler 252, a Logical File system 215, a DFS Client Virtual File system 220, cache 225, and other kernel services 254, the operations of which are known in the art, the DLFS-enabled client 200 is also provided with a DLFS Cache Manager Virtual File System 218, located between the Logical File system 215 and the DFS Client Virtual File system 220, for providing the access control feature. The DLFS Cache Manager Virtual File System 218 intercepts certain file-system operations issued by the Logical File system 215 in kernel mode 240 due to file system API requests 231 initiated by the application 230. The file-system operations that are intercepted may include lookup, file-open, and -access calls.

The implementation of DLFS on DFS clients 200 is performed by extending the operating system through the DLFS Cache Manager Virtual File System 218 running in a DFS client kernel mode 240. This allows the DLFS-enabled client 200 to transparently intercept file-system API requests 231. The primary reason for having the DLFS layer on the DLFS-enabled client 200, in addition to having the DLFS layer on the DFS file server 300, is so that the DLFS access control feature can be supported with correctness in the presence of the DFS client's authoritative caching for filename resolution.

At the DFS file server 300, in addition to its native operating system components, which include a DFS File Exporter 390, a Data Management Local File system 325, and a DFS Local File system 308 for controlling the storage system 305, the operations of which are known in the art, the DFS file server 300 is also provided with a Data Management Application 311 and the Data Links File Manager 385. The Data Management Local File system 325 allows transparent interception of file system operations by the Data Management Application 311. The Data Management Application 311 uses a DFS Storage Management Toolkit (not illustrated), allowing for the implementation of DLFS on the DFS file server 300 in the user mode 310, instead of a typical Virtual File System (VFS) kernel extension. In the preferred embodiment, the DFS Storage Management Tookit for DCE-DFS from TRANSARC™ is used, which is available from IBM Transarc, 11 Stanwix Street, Pittsburgh, Pa. 15222, USA.

In operation, when the application 230 residing on the DLFS-enabled client 200, accesses a field in the relational database DB 280 (by utilizing SQL API requests 401 over a network 400) that refers to an external data file residing in the DCE-DFS namespace, and in particular on the storage system 305 of the DFS file server 300, the relational database DB 280 responds with the reference to the external data file. The application 230 can now access the data file directly through the file system path using standard file-system API requests 231 over network 400.

The file-system API request 231 is issued to the system call handler 252, which in turn passes it to the Logical File system 215, and then the DLFS Cache Manager Virtual File System 218. The DLFS Cache Manager Virtual File System 218 performs any pre-processing operations required. Such pre-processing operations are only performed when client-side interception is required and may include validation of the embedded token in the specified filename during a filename lookup. If the DLFS Cache Manager Virtual File System 218 decides, based on the validity of the embedded token, to continue with the file request operation started by the file-system API request 231, the file request is passed to the DFS Client Virtual File system 220. The DFS Client Virtual File system 220 services this request either from its cache 225, or by making a Remote Procedure Call (RPC) to the DFS file server 300 over the network 400.

The DFS File Exporter 390, in a kernel mode 320 of the DFS file server 300, services the RPC by, in turn, invoking relevant kernel level file system routines in the Data Management Local File system 325. For certain operations, that may include rename, delete and permission change, the Data Management Local File system 325 sends a pre-event 312 to the Data Management Application 311, and waits for a response. The Data Management Application 311 may either reject the call, or let it continue by responding to the Data Management Local File system 325 with an appropriate response code.

In case of a rejection by the Data Management Application 311, the Data Management Local File system 325 returns an error code to the DFS File Exporter 390, which in turn sends back the error code to the DFS Client Virtual File system 220 of the DLFS-enabled client 200 from where the call originated.

The Data Management Local File system 325, on receipt of a response to continue from the Data Management Application 311, passes the request to the DFS Local File system 308, which services the request and returns to the Data Management Local File system 325. In certain situations, a post-event 312 may also get sent to the Data Management Application 311. The response is then passed to the DFS File Exporter 390, which passes it across the network 400 to the DFS Client Virtual File system 220 of the DLFS-enabled client 200 that issued the request. The DFS Client Virtual File system 220 passes the response to the DLFS Cache Manager Virtual File System 218, which in turn performs post processing if required. The response is then passed to the application 230 via the Logical File system 215 and the system call handler 252.

The foregoing is made possible through a division of roles between the DLFS-enabled client 200 and DFS file server 300 filter components, which are the DLFS Cache Manager Virtual File System 218 and the Data Management Application 3121. The integrity of the data files cannot be compromised, even from non-DLFS enabled DFS clients 201 illustrated in FIG. 2, where the DLFS filter layer is not installed. Thus the DLFS Cache Manager Virtual File System 218 is installed only on DFS clients 200 where the filter functionality is intended to be used by file system users/applications 230.

SPECIFIC EXAMPLES

The operation of the Datalink File System in the DCE-DFS 500 will now be illustrated by w ay of examples.

In a first example, a file "file.txt" is a controlled file owned by a special user dlfm. This user has read access enabled for user dlfm as well as for a group dlfmgrp. No other user has access. Read access is to be granted to any user who accesses the file "file.txt" with a valid token embedded in the filename. The token embedded filename is of the form "token-;file.txt".

The application 230 sends an open File System Request 231 using the name "token;file.txt" to the Logical File system 215 which first invokes the look-up operation of the DLFS Cache Manager Virtual File System 218. If the token is valid, the DLFS Cache Manager Virtual File System 218 strips the token from the filename and passes the look-up operation for "file.txt" to the DFS Client Virtual File system 220. If the operation cannot be serviced from the cache, the DFS Client Virtual File system 220 issues a further look-up and passes the request to the DFS File Exporter 390 of the DFS file server 300 where the "file.txt" is located.

The request is passed to the Data Management Local File system 325 which sends it to the DFS Local File system 308 where a look-up in the directory is performed for "file.txt", and an internal file locator returned to the Data Management Local File system 325 and the DFS File Exporter 390. The file location is then returned to the DFS Client Virtual File system 220, which passes it to the DLFS Cache Manager Virtual File System 218.

The Logical File system 215 now invokes an open request of the DLFS Cache Manager Virtual File System 218. Because "file.txt" is a controlled file, the DLFS Cache Manager Virtual File System 218 impersonates the group dlfmgrp, then passes the request to the DFS Client Virtual File system 220. The DFS Client Virtual File system 220 checks whether access is allowed by issuing a fetch access rights request to the DFS File Exporter 390 of the DFS file server 300 where the "file.txt" is located.

The fetch access rights request is passed to the Data Management Local File system 325 and down to the DFS Local File system 308 where a query on the caller's access rights for the file is performed, and a bitmask of allowed access for group dlfmgrp is returned to the Data Management Local File system 325 and back up to the DFS File Exporter 390. The DFS File Exporter 390 returns the allowed access rights for group dlfmgrp which includes read access to the DFS Client Virtual File system 220, which finds that read access exists, hence it performs the request and returns success to the DLFS Cache Manager Virtual File System 218. The DLFS Cache Manager Virtual File System 218 now turns off the impersonation and returns success to the Logical File system 215, which completes the open File System Request 231 and returns success to the application 230.

If the above operation is initiated from a non-DLFS enabled DFS client 201, then the DFS Client Virtual File system 220 would return a "file not found" error, when it receives the look-up request with the name "token;file.txt" from the application 230 via the system call handler 252 and the Logical File system 215, since there would be no DLFS Cache Manager Virtual File System 218 to strip the token from the filename.

In a second example, the application 230 sends an "open" File System Request 231 using the name "file.txt" (without a token) to the Logical File system 215 which first invokes the look-up operation to the DLFS Cache Manager Virtual File System 218. The DLFS Cache Manager Virtual File System 218 passes the look-up request to the DFS Client Virtual File system 220. If the look-up cannot be serviced from the cache, the DFS Client Virtual File system 220 issues a further look-up and passes the request to the DFS File Exporter 390 of the DFS file server 300 where the "file.txt" is located.

The request is passed to the Data Management Local File system 325 and down to the DFS Local File system 308 where a look-up in the directory is performed for "file.txt", and an internal file locator is returned to the Data Management Local File system 325 and back to the DFS File Exporter 390. The internal file locator is then returned to the DFS Client Virtual File system 220, which passes it to the DLFS Cache Manager Virtual File System 218.

The DLFS Cache Manager Virtual File System 218 queries this internal file locator to determine whether "file.txt" is a controlled file. Because "file.txt" is a controlled file, the DLFS Cache Manager Virtual File System 218 releases the internal file locator and returns an "access denied" message to the application 230.

In a third example, an application 230 running on a non-DLFS enabled DFS client 201 sends an "open" File System Request 231 using the name "file.txt" (without a token) to the Logical File system 215, which first invokes a look-up operation of the DFS Client Virtual File system 220. The DFS Client Virtual File system 220 issues the look-up and passes the request to the DFS File Exporter 390 of the DFS file server 300 where the "file.txt" is located if the look-up cannot be serviced from the cache.

The request is passed to the Data Management Local File system 325 and down to the DFS Local File system 308 where a look-up in the directory is performed for "file.txt", and an internal file locator is returned to the Data Management Local File system 325 and up to the DFS File Exporter 390. The internal file locator is then returned to the DFS Client Virtual File system 220.

The Logical File System 215 now invokes an open request of the DFS Client Virtual File system 220. The DFS Client Virtual File system 220 checks whether access is allowed by issuing a fetch access rights request to the DFS File Exporter 390 of the DFS file server 300 where the "file.txt" is located.

The fetch access rights request is passed to the Data Management Local File system 325 and down to the DFS Local File system 308, where a query on the caller's access rights for the file is performed, and a bitmask of the access for the user is returned to the Data Management Local File system 325 and up to the DFS File Exporter 390. In this case, the bitmask would not indicate read access since the call was not made with the identity of the group dlfmgrp or the user dlfm. The DFS File Exporter 390 returns the bitmask to the DFS Client Virtual File system 220, which passes an access denied error message to the Logical File system 215, which is sent back up to the application 230, since the bitmask does not indicate read "access allowed".

In a fourth example, a "remove" command is issued by application 230 for a file "file2.txt" whose referential integrity is to be protected. On receipt by the DFS Client Virtual File system 220, the remove file2.txt request is issued to the DFS File Exporter 390 of the DFS file server 300 where "file2.txt" is located.

The DFS File Exporter 390 forwards the request to the Data Management Local is File system 325, from where a pre-event 312 message is sent to the Data Management Application 311. The Data Management Application 311 determines from the Data Links File Manager 385 that file2.txt is a protected file and rejects the call by returning an access denied message to the Data Management Local File system 325.

The Data Management Local File system 325 returns an error code to the DFS File Exporter 390, which in turn sends back the error code to the DFS Client Virtual File system 220 of the DLFS-enabled client 200 from where the call originated.

In a fifth example, a "remove" command is issued by application 230 for a file "file3.txt" whose referential integrity does not need to be protected. On receipt by the DFS Client Virtual File system 220, the remove file3.txt request is issued to the DFS File Exporter 390 of the DFS file server 300 where "file3.txt" is located.

The DFS File Exporter 390 forwards the request to the Data Management Local File system 325, from where a pre-event 312 message is sent to the Data Management Application 311. The Data Management Application 311 discovers from the Data Links File Manager 385 that file3.txt is not a protected file and sends a response to continue to the Data Management Local File system 325.

The Data Management Local File system 325 passes the remove request to the DFS Local File system 308, which services the request by removing "file3.txt" from the storage system 305 and returns a success message to the Data Management Local File system 325. The success message is passed along the route all the way back to the application 230.

Division of Roles Between Client and Server

Figure 4:
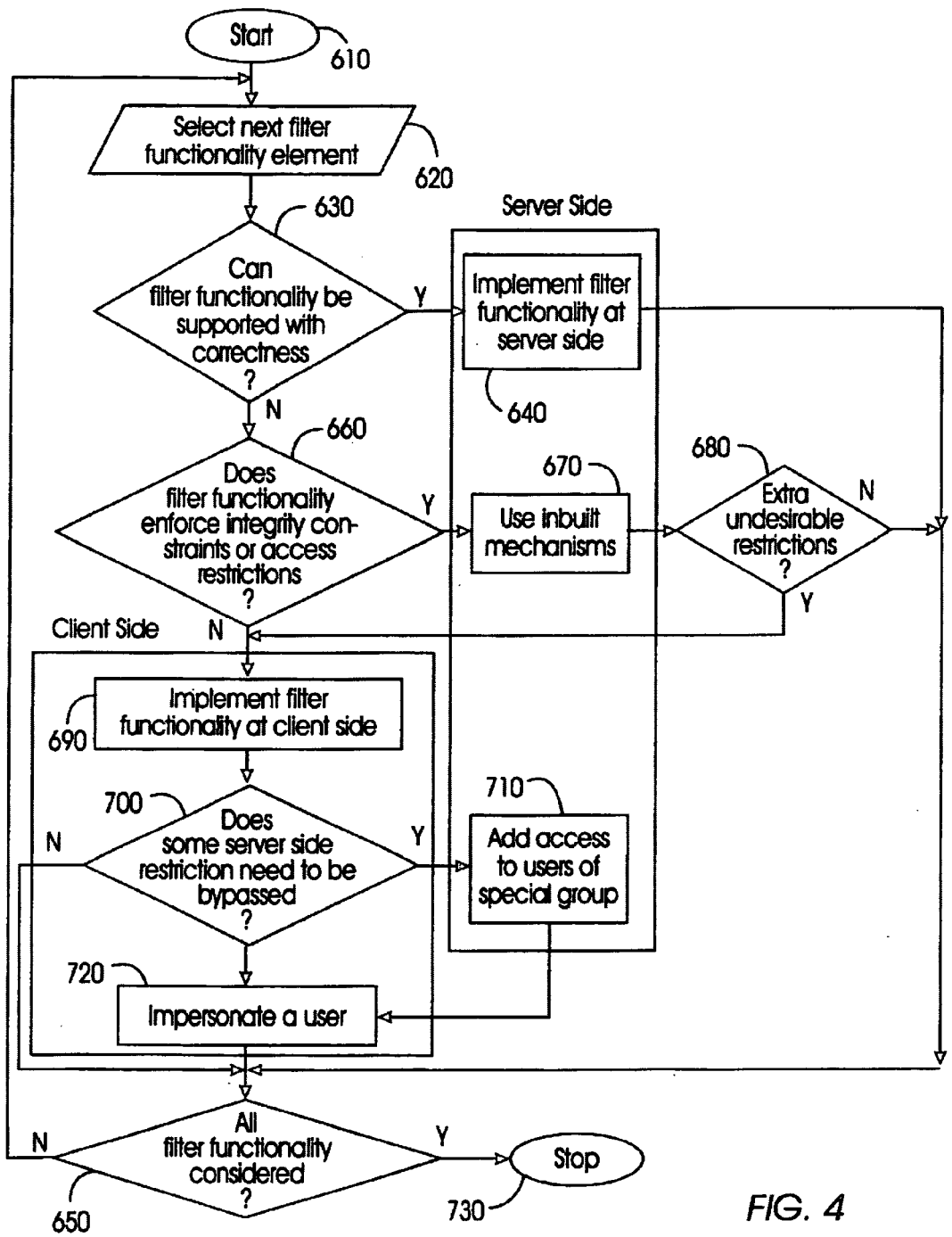
FIG. 4 is a flow diagram of a procedure for the division of roles between the DLFS Cache Manager Virtual File System of the DLFS-enabled client and the Data Management Application of the DFS file server.

A general procedure for the division of roles between the DLFS Cache Manager Virtual File System 218 of the DLFS-enabled client 200 and the Data Management Application 311 of the DFS file server 300 is illustrated in FIG. 4. Starting the procedure 600 at a step 610, a step 620 selects a next filter functionality element provided by filter file system.

A step 630 determines whether the selected filter functionality can be supported with correctness, even with DFS client's "authoritative caching". If the determination in step 630 is affirmative, then the procedure 600 continues to step 640. Otherwise, the procedure 600 continues to step 660.

Step 640 implements the selected filter functionality at the DFS file server 300, thereby simplifying the design at the DLFS-enabled client 200 (and also keeping a client side footprint low). The procedure 600 then continues to a step 650.

Step 660 determines whether the selected filter functionality enforces integrity constraints or access restrictions of the file system data (including meta-data), such that these restrictions would hold even for accesses from non-DLFS-enabled DFS clients 201. If the determination in step 660 is affirmative, then the procedure continues to step 670. Otherwise, the procedure 600 continues to step 690.

Step 670 uses the inbuilt DCE-DFS mechanisms, like Access Control lists (ACLs), to implement the selected functionality. An ACL is a list of entries allowing or denying a set of access rights to a particular user or group. These inbuilt DCE-DFS mechanisms are guaranteed to be honoured for file system accesses from any DFS client 200 and 201. Additionally, the inbuilt DCE-DFS mechanisms may be supplemented through the DFS server filter layer (Data Management Application 311) wherever appropriate and feasible.

Following step 670, step 680 determines whether it became necessary to impose greater restrictions than those originally intended for access from non-DLFS-enabled DFS clients 201 due to a limitation on the degree of control possible using the inbuilt DCE-DFS mechanisms. The main consideration here is that protection of integrity needs to happen at the filter layer closest to the data. If no extra unwanted restrictions got introduced as a side affect, the procedure 600 continues to step 650. Otherwise, the procedure 600 continues to step 690.

In the case where step 690 follows step 660, the selected filter functionality is implemented through the DFS client filter layer in the DLFS Cache Manager Virtual File System 218. If step 690 follows step 680, the extra restrictions that got imposed as a result of step 670 are compensated for in the DFS client filter layer in the DLFS Cache Manager Virtual File System 218.

A problem that might be encountered after the implementation of step 690 is that the DLFS Cache Manager Virtual File System 218 processing may not be independent to the DFS file server 300 controls imposed in step 670, because the DFS client 200 or 201 depends on the DFS file server 300 for supplying it with the actual data and for effecting any modifications on the real physical file system. However, due to step 670, there could already be restrictions on certain types of accesses to the DFS server file system data from all DFS clients 200 and 201. Therefore, step 700 determines whether there is a need to bypass some server side restrictions imposed in step 670. If step 700 determines that there is such a need, then the procedure continues to step 710. Otherwise, the procedure continues to step 650.

To overcome such restrictions, especially if it is responsible for granting special kinds of accesses to file data, the client side layer, DLFS Cache Manager Virtual File System 218, requires some way to indicate to the DFS file server 300 that it has already performed any necessary checks for blocking unauthorized accesses or integrity infringements, and that the operation it is requesting is indeed a valid one. In other words, it should have some way of identifying itself as a legitimate client layer which the DFS file server 300 can trust. In the preferred embodiment, this is achieved in step 720 by allowing the DLFS Cache Manager VFS 218 to assume a special identity, which, in step 710 was given the requisite access in ACLs of the files concerned, or which the DFS file server 300 can recognize as trustworthy.

The main difficulty with trying to impersonate a specific user in step 720 is that, for all the DLFS-enabled clients 200 to impersonate the same user identity, they need to have the password or key of that user available to them in order to be able to acquire authentic network credential representing that user identity. Since there could be several such DLFS-enabled DFS clients 200 on the network 400, distribution and synchronization of the password or key across all these DFS clients 200 is necessary.

Therefore, in the preferred embodiment, in order to implement steps 710 and 720, a special group is first defined for the purpose. Each DLFS-enabled client 200 impersonates a distinct user identity that belongs to this group. The DFS file server 300 should allow access to this group (e.g., through appropriate ACL entries for specific files, or through the DFS server filter layer, Data Management Application 311). Since each such user identity would have its own password or key, there is no need for sharing a password or key across DLFS-enabled clients 200. Procedure 600 then continues to step 650.

Step 650 determines whether all filter functionality elements has been considered. If this determination is affirmative, then the procedure 600 ends in step 730. Otherwise, the procedure 600 continues to step 620 wherein the next filter functionality element is selected.

Advantages

Advantages of embodiments of the present invention include:

Transparent interception of filesystem operations for implementing filter functionality is possible even in the face of "authoritative caching" by DFS clients 200 and 201.

The client side filter component (DFS Client Virtual File system 220) need not be installed on all DFS clients 200 and 201, but only on certain DLFS-enabled clients 200, where Datalinks applications are run, without compromising Datalinks specific referential integrity requirements.

By allowing each DLFS-enabled client 200 to impersonate a distinct user identity that belongs to a group, the need for distribution and synchronization of passwords and/or keys that would have otherwise been required is removed.

The foregoing describes only some embodiments of the present invention, and modifications and/or changes can be made thereto without departing from the scope and spirit of the invention, the embodiment being illustrative and not restrictive.

We claim:

1. A client-server filter computing system supporting relational database records and linked external files operable for distributed file systems, the system comprising:

one or more servers storing external files;

one or more clients in communication with said servers;

a filtering mechanism, used by said servers and said clients, comprising a client filter layer and a server filter layer, wherein if a respective client filter layer determines the validity of a command to a server, said server filter layer bypasses server side restrictions in granting access to said external files, such that access is granted to said external files based upon a combination of approval by said server filter layer and said client filter layer.

2. The computing system of claim 1, wherein said client filter layer determines the validity of said command by determining the presence of a valid user token.

3. The computing system of claim 1, wherein the client filter layer of both enabled and non-enabled clients will pass a non-protected application command relating to an external file to the filter layer of a server containing the external file, and be serviced by the server.

4. The computing system of claim 1, wherein the client filter layer of said client checks validity of a token attached to the command and strips the token before passing the command to the filter layer of the server containing the external file.

5. The computing system of claim 4, wherein the client filter layer of said client performs impersonation for the command to the server containing the external file, the impersonation being in a form recognized by the server, the server then servicing the command.

6. The computing system of claim 5, further comprising a database linked to the servers, storing relational records related to the external files such that one or more relational records and one or more external files form a single data record, and wherein an application of said client also passes the command to the database for execution.

7. The computing system of claim 5, wherein a client further comprises a cache that can hold the external file and wherein, if the external file is present, the command is executed, else the command is passed to the server filter layer.

8. The computing system of claim 7, wherein the command is to open an external file.

9. The computing system of claim 7, wherein the command is to remove an external file.

10. The computing system of claim 7, wherein each server includes a storage system in which the external files are stored.

11. The computing system of claim 1, wherein the distribution of filter layer functionality for a set of commands between the clients and the servers favors the servers if a command can be supported with one of correctness and enforces integrity constraints or access restrictions.

12. In a client-server filter computing system a method for supporting relational database records and linked external files comprising;

for any application command relating to an external file made to a client:

determining, by a respective client filter layer, the validity of the command; and passing the command to a server, if said respective client filter layer determines the validity of said command, said server filter layer bypasses server side restriction in granting access to said external files, such that access is granted to said external files based upon a combination of approval by said server filter layer and said client filter layer.

13. The method of claim 12, further comprising determining the presence of a valid user token.

14. The method of claim 12, comprising the further steps of:

for a non-protected application command relating to an external file made to a first or a second type of client:

forwarding the command to the server filter layer of a server holding the external file; and servicing the command by the server.

15. The method of claim 12, comprising the further step of the client filter layer checking validity of a token attached to the command and stripping the token before passing the command to the filter layer of the server containing the external file.

16. The method of claim 15, comprising the further step of the client filter layer performing impersonation for the protected command to the server containing the external file, the impersonation being in a form recognized by the server, the server then servicing the protected command.

17. The method of claim 16, the method comprising a further step of passing the command to a database for execution by an application of a client.

18. The computing system of claim 16, in which the client further comprises a cache, the method comprising the further steps of searching the cache for the external file and, if the external file is present in the cache, executing the command, else passing the command to the server filter layer.

19. The method of claim 18, wherein said command is to open an external file.

20. The method of claim 18, wherein said command is to remove an external file.

21. The method of claim 18, wherein each server includes a storage system for storing the external files.

22. The method of claim 12, wherein the distribution of filter layer functionality for a set of commands between the clients and the servers favors the servers if a command can be supported with correctness, enforcing integrity constraints, or access restrictions.

23. A client-server filter computing system supporting relational database records and linked external files operable for distributed file systems, the system comprising:
   a plurality of servers storing external files in a memory;
   a plurality of enabled clients in communication with said servers;
   a filtering mechanism, used by said servers and said clients, comprising a client filter layer and a server filter layer,
   wherein if a respective client filter layer determines the presence of a valid user token associated with a command to a server, said server filter layer bypasses server side restrictions in granting access to said external files, such that access is granted to said external files based upon a combination of approval by said server filter layer and said client filter layer.

24. The computing system of claim 23, wherein the client filter layer of both enabled and non-enabled clients will pass a non-protected application command relating to an external file to the filter layer of a server containing the external file, and be serviced by the server.

25. The computing system of claim 23, wherein the client filter layer of an enabled client checks validity of a token attached to the command and strips the token before passing the command to the filter layer of the server containing the external file.

26. The computing system of claim 25, wherein the client filter layer of an enabled client performs impersonation for the command to the server containing the external file, the impersonation being in a form recognized by the server, the server then servicing the command.

27. The computing system of claim 26, wherein the client further comprises a cache that can hold the external file and wherein, if the external file is present, the command is executed, else the command is passed to the server filter layer.

28. The computing system of claim 27, wherein the command is to open an external file.

29. The computing system of claim 24, wherein the command is to remove an external file.

30. The computing system of claim 27, wherein each server includes a s storage system in which the external files are stored.

31. The computing system of claim 23, wherein the distribution of filter layer functionality for a set of commands between the clients and the servers favors the servers if a command can be supported with one of correctness and enforces integrity constraints or access restrictions.

* * * * *